(12) United States Patent
Youden et al.

(10) Patent No.: US 6,340,820 B1
(45) Date of Patent: Jan. 22, 2002

(54) NEAR-VISIBLE LIGHT DETECTION METHOD AND APPARATUS

(75) Inventors: Katharine E. Youden; David F. Arnone, both of Mountain View; Mona Wallace, Saratoga; Robert Shine, San Jose, all of CA (US)

(73) Assignee: New Focus, San Jose, CA (US)

( * ) Notice: Subject to any disclaimer, the term of this patent is extended or adjusted under 35 U.S.C. 154(b) by 0 days.

(21) Appl. No.: 09/245,612

(22) Filed: Feb. 4, 1999

(51) Int. Cl.⁷ .................................................. G01J 1/58
(52) U.S. Cl. .................................. 250/484.4; 250/483.1
(58) Field of Search ........................... 250/483.1, 361 R, 250/372, 484.2, 484.4, 472.1, 474.1, 462.1, 909

(56) References Cited

U.S. PATENT DOCUMENTS

| | | | | |
|---|---|---|---|---|
| 4,722,376 A | * | 2/1988 | Rhyner .................. | 150/147 |
| 4,842,960 A | * | 6/1989 | Lindmayer .............. | 428/690 |
| 5,377,733 A | * | 1/1995 | Halley et al. .............. | 151/147 |
| 5,466,947 A | * | 11/1995 | Fleig et al. .............. | 250/582 |
| 5,631,767 A | * | 5/1997 | Dodge et al. .............. | 359/328 |
| 6,057,250 A | * | 6/2000 | Fukui et al. .............. | 250/484.4 |

* cited by examiner

Primary Examiner—Constantine Hannaher
Assistant Examiner—Albert Gagliardi
(74) Attorney, Agent, or Firm—Wilson Sonsini Goodrich and Rosati; David Abraham (57) ABSTRACT

Disclosed is an apparatus for detecting near-visible frequency light comprising a sensor which includes a near-visible to visible light conversion phosphor defining an active area and a covering having a thickness, the covering adapted to substantially protect the phosphor from degradation. The phosphor extends to within about a first distance of a flush portion of a first edge, the first distance corresponding approximately to the thickness of the covering. In an alternative embodiment, the active area comprises an aperture.

22 Claims, 10 Drawing Sheets

NEAR-VISIBLE LIGHT DETECTION METHOD AND APPARATUS

BACKGROUND OF THE INVENTION

1. Field of Invention

The invention generally relates to detection and alignment of light outside the visible region of the spectrum. More specifically, the invention relates to a laminated card and the use of the laminated card for near-visible light detection and beam alignment.

2. Description of Related Art

A near-visible light detection apparatus enables a user to determine whether a near-visible light source is functioning. The detection apparatus can also determine the location of a near-visible light beam, and align a plurality of beams.

The prior art includes laminated detector cards from Quantex, now Lumitek International, Inc., that have active phosphor sensor regions. Examples of the prior art detector cards include the Lumitek infrared sensor cards (e.g., Q-11, Q-16, Q-32 and Q-42 cards), and the Lumitek ultraviolet sensor cards (e.g., U-21-R and U-21-T cards). The detector cards provide an instantly visible pattern for determining spatial information about the beam, such as beam location and approximate beam size for near-visible light beams. In addition, the high sensitivity of the detectors provides users of various near-visible light sources and components (e.g. emitting diodes, optical fibers, etc.) with a tool for determining the presence or absence of near-visible light.

The sensor regions extend out towards the edge of the detector cards, but are separated from the card edges by a laminated edge width. In the prior art, the required minimum laminate edge width from the edge of the detector card to the sensor region is approximately five millimeters.

Because the phosphor sensor is separated from the edge of the prior art detector card by approximately five millimeters, the user is not able to place the sensor in a position to detect near-visible light on some impinged surfaces. Where the near-visible light of interest is present only within less than five millimeters of an obstructing structure, the prior art cards cannot detect the light. The obstructing structure prevents the user from manipulating the prior art card into a detection position because the phosphor sensor is approximately five millimeters from the card edge. For example, in a tightly spaced beam manipulation system, the near-visible light beam is reflected from a first to a second surface. The prior art detector cards are unable to determine where the beam is impinging the first surface if the impingement occurs within less than five millimeters of an edge of a surface that prevents placement of the card above or on the other side of the surface.

When confronted with such limited access equipment, users of prior art detector cards were forced to trim off the laminated edge to place the sensor at the location needed for beam detection. After removal of the laminate material, the detector card phosphor sensor is exposed to ambient conditions and degrades from exposure to air and humidity in a few months. A new card must then be used for further detection needs.

There is a need for a durable apparatus for detecting near-visible light in limited access conditions. This need is not addressed by detector cards or other apparatus with protective coverings disclosed in the background art.

SUMMARY OF THE INVENTION

One aspect of the invention provides an apparatus for detecting light having a near-visible frequency. The near-visible light can be infrared light having wavelengths approximately between 0.8 micrometers and 1.7 micrometers, or ultraviolet light having wavelengths approximately between 250 nanometers and 500 nanometers. The apparatus includes a sensor and a covering.

The sensor includes a near-visible to visible light conversion phosphor. The phosphor defines an active area of the apparatus. The phosphor extends to within about a first distance of a flush portion of a first edge.

The covering has a thickness. The covering is adapted to cover the sensor and to substantially protect the phosphor from degradation. The first distance corresponds approximately to the thickness of the covering.

DETAILED DESCRIPTION

The invention and the various features and advantageous details thereof are explained more fully with reference to the non-limiting embodiments that are illustrated in the accompanying drawings and detailed in the following description. Descriptions of well-known components and processing techniques are omitted so as not to unnecessarily obscure the invention in detail.

One aspect of the invention provides an apparatus for detecting near-visible frequency light. The apparatus includes a sensor and a covering. Some flush edge detector card embodiments of the apparatus are illustrated in FIGS. 2 through 7. The apparatus can also be provided in many other configurations, such as a dipstick (as shown in FIG. 8), a stylus, a probe, or any other shape adapted for coating by a thin protective covering.

The sensor includes a near-visible to visible light conversion phosphor. Light having wavelengths close to the visible range is considered near-visible light, i.e., in the range of 250 to 500 nanometers, or 0.7 to 1.7 micrometers. The area of the apparatus having phosphor is the active area. For the embodiments shown in FIGS. 2A through 2D, 3A, and 3B the active area includes a reflective sensor portion 235 and a transmissive sensor portion 240.

Figures 2A, 2B:
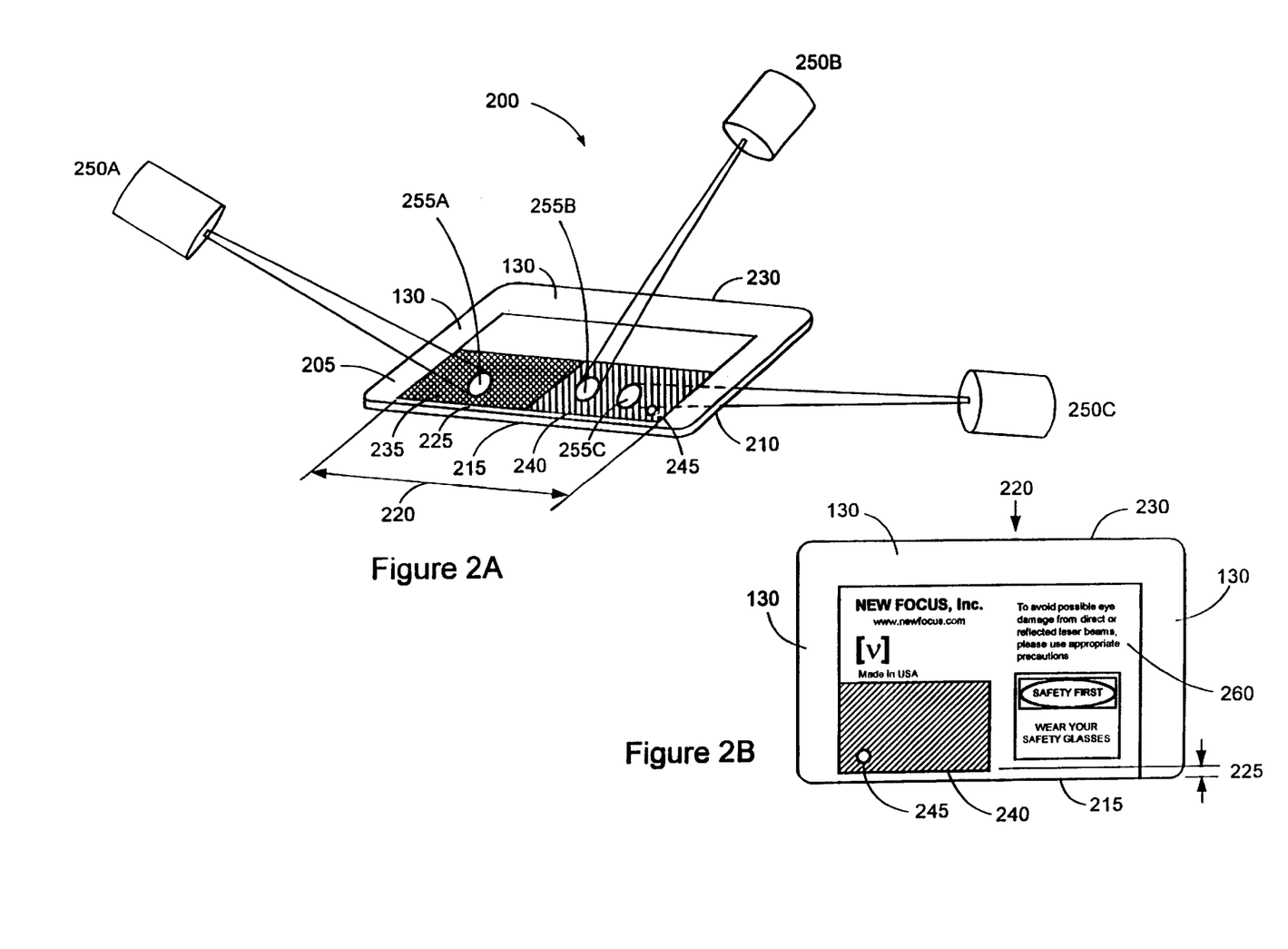
FIG. 2A illustrates a perspective view of a flush edge detector card with rectangular sensor regions.
FIG. 2B illustrates the back side of a flush edge detector card with rectangular sensor regions.

The phosphor extends to within about a first distance of a flush portion of a first edge. The first edge is shown in FIGS. 2A through 2D, and FIGS. 3A and 3B as the flush edge 215. The first distance is typically less than two millimeters, and is shown in FIG. 2B as the separation distance 225 between the flush edge 215 and the phosphor.

The sensor includes a near-visible to visible conversion phosphor layer. The sensor can be deposited or otherwise provided on a substrate surface. Sensor materials are electron trapping and light energy converting materials that emit visible light when illuminated by near-visible light. The sensor material can be a phosphor that traps near-visible light and converts the energy from the trapped near-visible light to emit visible light. Infrared (IR) light or ultraviolet (UV) light is detected using flush edge detector cards having sensor materials.

Exposure of electron trapping upconverting materials to IR light produces a diffuse localized visible glow for detection and location of IR sources. The visible glow duplicates the spatial properties of the IR light impinging on the active phosphor material. This duplication allows the exact position and spatial extent of the IR light to be monitored. Examples of these materials are described below. IR detectors made from the upconverting phosphors provide a low cost alternative to laser beam finders and beam profile instruments.

IR upconverting phosphor coatings are available having emission wavelengths of approximately 485 nanometers (blue-green, Lumitek Q-16), 625 nanometers and 640 nanometers (orange, respectively Lumitek Q-11 and Q-42), and 650 nanometers (red, Lumitek Q-32). The highest normal light minimum IR intensity (approximately 800 microwatts per square centimeter) is provided by the Q-32 phosphor coating, having an emission wavelength of 650 nanometers.

The 650 nanometers emission coating is typically used for the present invention. However, for embodiments adapted for low light level conditions (such as experimental beam systems situated in dark rooms), the preferred Q-11 phosphor has an emission wavelength of 625 nanometers and provides a minimum IR intensity of approximately 12 microwatts per square centimeter.

The near-visible light detector cards are available for different IR wavelength sensitivities, minimum IR intensities under low and normal ambient light conditions, and sensor emission wavelengths. Typical IR detector card resolution is approximately 3 line pairs per millimeter.

The upconverting phosphors for IR detection require brief excitation by daylight, fluorescent, or any normal indoor light source in order to operate. Such charging can be accomplished in less than a minute, after which the phosphor is ready to detect and display indications of infrared light. The phosphor does not overcharge, even in full sunlight. Because the phosphor has a half-life of 24 hours, it has the capacity to remain charged for several days.

The invention can provide the sensor materials in flush edge detector cards. The laminated flush edge detector cards provide an instant visible pattern for determining beam location and approximate beam size. In addition, the high sensitivity of the detectors provides users of various IR sources and components (e.g. emitting diodes, optical fibers, etc.) with a tool for determining the presence or absence of near-visible light.

The sensor materials may also be used in optically clear sensor screen holders, such as the Lumitek Q-16 IRSCR-27, and targeting templates. The targeting templates can have a plurality of apertures, where the apertures have diameters ranging from approximately 0.4 millimeters to 13 millimeters. The apertures are used for beam position determination and beam-to-device coupling. The sensor materials can also be used as adhesive backed transmissive sensor screens such as the Lumitek ADQ42, and large area image screens, such as the Q-42LASR35. The transmissive sensor screens use phosphors coated on transparent Mylar with an adhesive back. The large area image screens are used for far-field studies or imaging highly divergent beams. Sensor materials can also be used in high temperature sensor screens such as the Lumitek CF 16-R. The high temperature screens have phosphor powder thermally fused on a high temperature ceramic substrate and are used for Neodymium-Yttrium Alumina Garnet and Carbon Dioxide lasers for up to 100 watts per square centimeter.

Ultraviolet (UV) sensor materials downconvert UV light to red visible light, and are used for UV detectors.

The covering has a thickness and covers the sensor and protects the phosphor from degradation. One embodiment of the covering is the butterfly laminate jacket 500 for sealing an internal portion shown in FIG. 5 and described below. The first distance corresponds approximately to the thickness of the covering. The covering may include an adhesive layer disposed proximally to the sensor, and a polyester layer covering the adhesive layer. For some embodiments, the adhesive layer and the polyester layer have a combined thickness of no greater than three millimeters. The adhesive layer has a thickness of approximately one millimeter, and the polyester layer has a thickness of approximately two millimeters.

The flush edge detector card can include a substrate, a sensor, and a covering. The substrate can be made of paper, polycarbonate, Teslin®, or ceramic. Paper substrates are for basic detection (not for high temperature use). Polycarbonate substrates are rigid with reticle patterns on them for laser beam alignment. Ceramic substrates are used for high temperature use with sources that would burn through a paper substrate.

Figure 1:
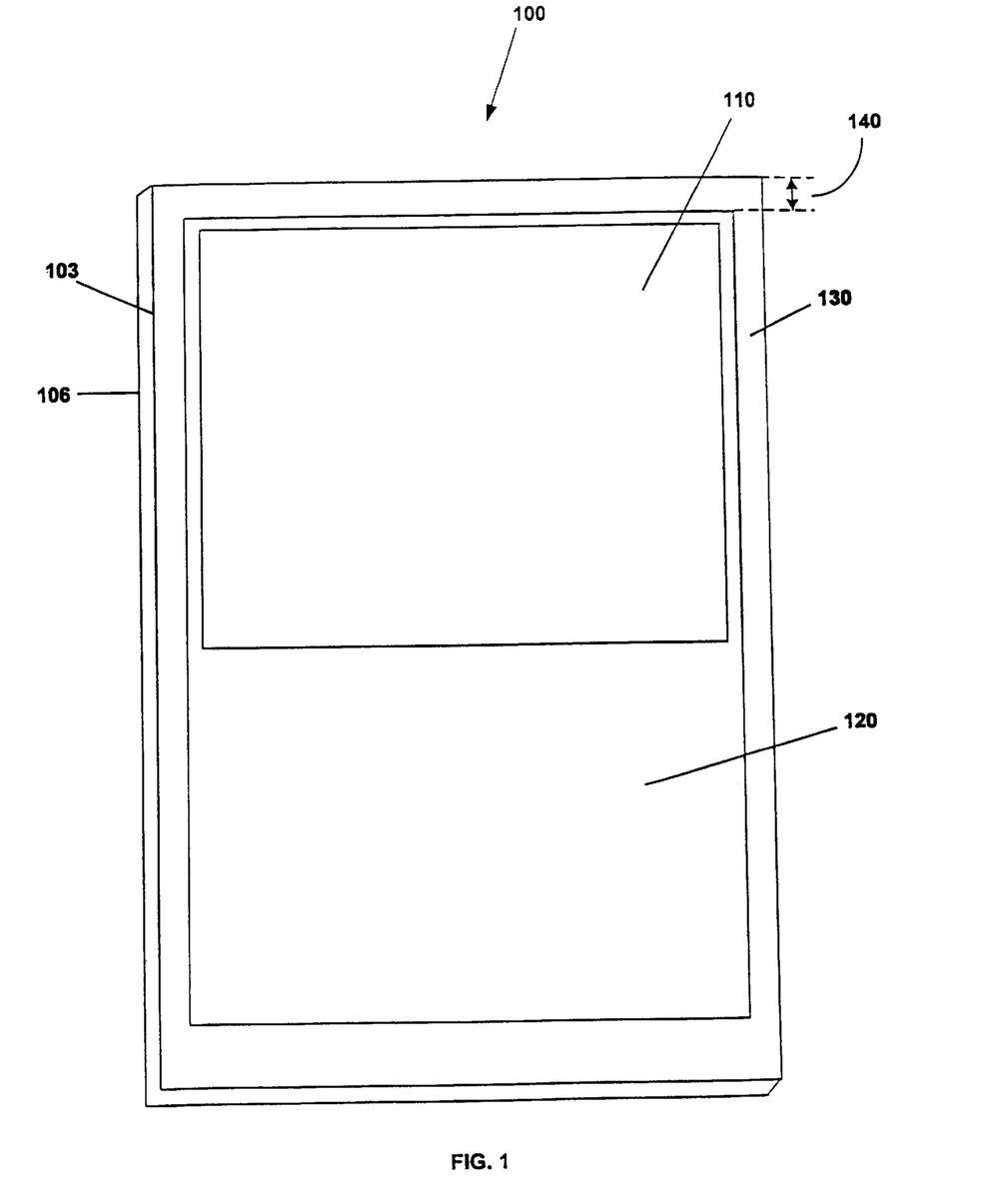
FIG. 1 illustrates a prior art detector card.

A prior art detector card 100, shown in FIG. 1, has a sensor region 110, a printed matter region 120, and a laminated edge region 130. The laminated edge region 130 surrounds both the sensor region 110 and the printed matter region 120. For the prior art card shown in FIG. 1, the laminate edge width 140 is the distance from the edge of the detector card to the printed matter region 110. In the prior art, the laminate edge width 140 is typically as large as five millimeters.

In some prior art detector card configurations, the sensor region 110 is disposed next to the laminated edge region, and the laminate edge width 140 is the distance between the sensor region 110 and the prior art detector card edge. For these embodiments, the laminate edge width 140 of approximately five millimeters can be more directly compared with the separation distance 225 of the flush edge detector card. Embodiments of the flush edge detector card include the flush edge detector card with rectangular sensor regions 200 shown in FIGS. 2A and 2B, and the flush edge detector card with triangular sensor regions shown in FIGS. 3A and 3B.

Certain versions of these embodiments have been fabricated as the New Focus, Inc. Model 5841 IR Sensor Card. The separation distance 225 for these flush edge detector cards is approximately less than 0.5 millimeters, or approximately ten times smaller than the laminate edge widths 140 for prior art detector cards 100. Each of these flush edge detector cards is rectangular in shape, with a width of approximately 85 millimeters, a height of approximately 55 millimeters, and a thickness of approximately one millimeter (40 mils). While these embodiments are very useful, the flush edge detector card can be provided in many different shapes, for example a single circular edged card, and can be provided in many different sizes.

As shown in FIG. 2A, the flush edge detector card with rectangular sensor regions has a front side 205, a back side 210, and a top edge 230.

As shown in FIGS. 2A through 2D, and FIGS. 3A and 3B, the phosphor extends essentially flush against the flush edge 215 of the flush edge detector card. For the flush edge detector card with rectangular sensor regions 200 shown in FIGS. 2A and 2B, the bottom edge is the flush edge 215. For a flush portion width 220 of the flush edge 215, the sensor phosphor extends to within a first distance from the flush edge. The first distance is shown as the separation distance 225 in FIGS. 2A through 2D, and FIGS. 3A and 3B. For the embodiments shown in these Figures the flush edge separation distance 225 from the flush edge is less than 0.5 millimeters.

Smaller separation distances 225 are preferred for detecting near-visible light in limited access conditions. The separation distance 225 for the cards shown in FIGS. 2 through 7 results from the lamination process. The laminate configuration used to obtain separation distances 225 less than 0.5 millimeters is described below with reference to FIGS. 4 through 7. Smaller separation distances 225 can be obtained by dipping a sensor into a low temperature cure resin coating, where the covering comprises the cured resin.

Any one, or more than one, of the edges of the flush edge detector card may be a flush edge 215. The flush edge detector card can include only straight edges for any number of straight edges equal to or greater than three. In other configurations, the flush edge detector card can include a single circular edge, or a combination of rounded edges with straight edges.

In FIGS. 2A through 2D and FIGS. 3A and 3B, the flush edge 215 is shown having a large centrally disposed flush portion having the sensor phosphor extending essentially flush against the flush edge. Two smaller portions of the flush edge 215, disposed on each side of the flush portion have no sensor phosphor. The flush portion width 220 can vary according to the desired use of the near-visible light detection apparatus and apparatus fabrication considerations.

In FIGS. 2A through 2D the active area of the flush edge detector card with rectangular sensor regions 200 is defined by the phosphor and comprises a reflective sensor portion 235 and a transmissive sensor portion 240. When viewed from the front side of the detector card, the reflective sensor portion 235 is disposed on the right hand side of the detector card, and the transmissive sensor portion 240 is disposed on the left hand side of the detector card. An opaque material is placed behind the reflective sensor portion 235.

The reflective sensor portion 235 emits visible light only in response to near visible light sources that impinge the front side of the detector card. For example as shown in FIG. 2A, a first source of near visible light 250A is directed at the detector card from above the front side and impinges the detector card in an area of the reflective sensor portion 235 indicated by a first visible light emitting region 255A. The visible light emission from the reflective sensor portion 235 can only be observed on the front side of the detector card. For example, the visible light emitted from the first visible light emitting region 255A is observed only on the front side of the detector card.

The transmissive sensor portion 240 emits visible light in response to near visible light sources that impinge either the front or the back side of the detector card. For example, the second source of near visible light 250B is directed at the detector card from above the front side and impinges the detector card in an area of the transmissive sensor portion 240 indicated by a second visible light emitting region 255B. A third source of near visible light 250C is directed at the detector card from below the back side and impinges the detector card in an area of the transmissive sensor portion 240 indicated by a third visible light emitting region 255C. The visible light emission from the transmissive sensor portion 240, e.g., second visible light emitting region 255B and the third visible light emitting region 255C can be viewed from either the front side or the back side. Note that the reflective sensor portion 235 typically provides a brighter visible light emission than the transmissive sensor portion 240.

The flush edge detector card can also have a transmissive hole, such as the aperture 245 shown in FIGS. 2A through 2D, and 3A and 3B. The aperture 245 can be disposed in either the transmissive sensor portion 240, as shown in the Figures, or the reflective sensor portion.

The aperture 245 can be used for aligning a beam. The beam can be directed at a fixed detector card and moved towards the aperture based on the location of the emitted visible light from the sensor material in the detector card. Once aligned, the beam will continue through the aperture 245. If the beam is larger than the aperture 245, the visible light emitted from the sensor material the shape of the emitted light outside the aperture 245 can be used to align the beam.

The flush edge detector card 200 can provide an aperture 245 in either the reflective sensor region 235, or the transmissive sensor region 240. For the embodiment shown in FIGS. 3A, 3B, 4A, and 4C, the aperture 245 is provided as a phosphor aperture disposed in the transmissive sensor region 240. The aperture 245 shown in FIGS. 3A, 3B, 4A, and 4C, has a diameter of approximately 3.0 millimeters.

In some embodiments, two or more apertures 245 are provided in the flush edge detector card 200, including a first aperture in the reflective sensor region 235, and a second aperture in the transmissive sensor region 240. In some embodiments, the apertures 245 are through holes with card edges defining the perimeter of the aperture 245, the card edges comprising the laminate material. The area of the aperture 245 can be a phosphor aperture with only inactive light transmissive material extending over the area of the phosphor aperture. The inactive transmissive material can be polyester or polycarbonate. For both the through hole and the phosphor aperture, the front side laminate layer 410 and the back side laminate layer 420 provide a seal protecting the phosphor in the sensor next to the aperture 245 from degradation due to exposure to the ambient atmosphere.

The flush edge detector card can also have an area for printed matter. For example as shown in FIG. 2B, the flush edge detector card 200 with rectangular sensor regions has printed matter disposed in a printed material region 260. The printed material region 260 provides an area for various safety warning and identification purposes. The print material region 260 can contain personal information such as the address and the phone number for a particular user. Such information increases the useful life of the flush edge detector cards, because misplaced cards having such information are more likely to be returned to their owner. As shown in FIG. 2B, the printed material region 260 is disposed above the active area of the detector card and behind the reflective sensor portion 235.

Figure 2C:
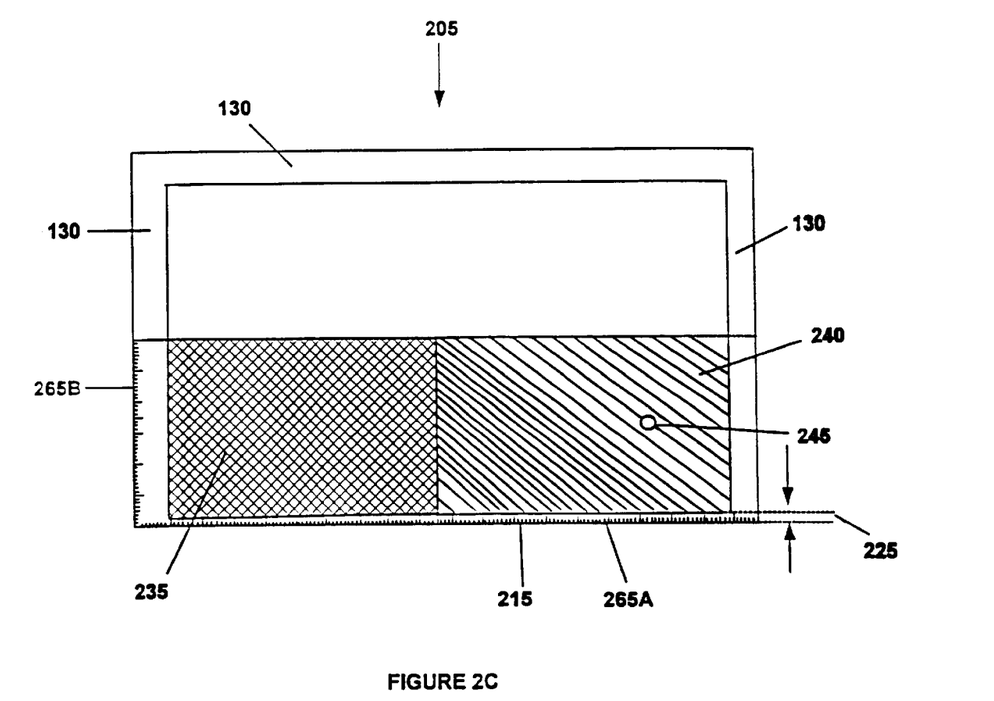
FIG. 2C illustrates the front side of a flush edge detector card having two ruled edges.

FIG. 2C shows the front side 205 of a flush edge detector card with rectangular sensor regions. The detector card shown in FIG. 2C includes a ruler corresponding to the flush edge 265A, and a ruler corresponding to a second edge 265B. These rulers are disposed on the covering and are typically applied thereto after the sensor material is enclosed by the covering.

Figure 2D:
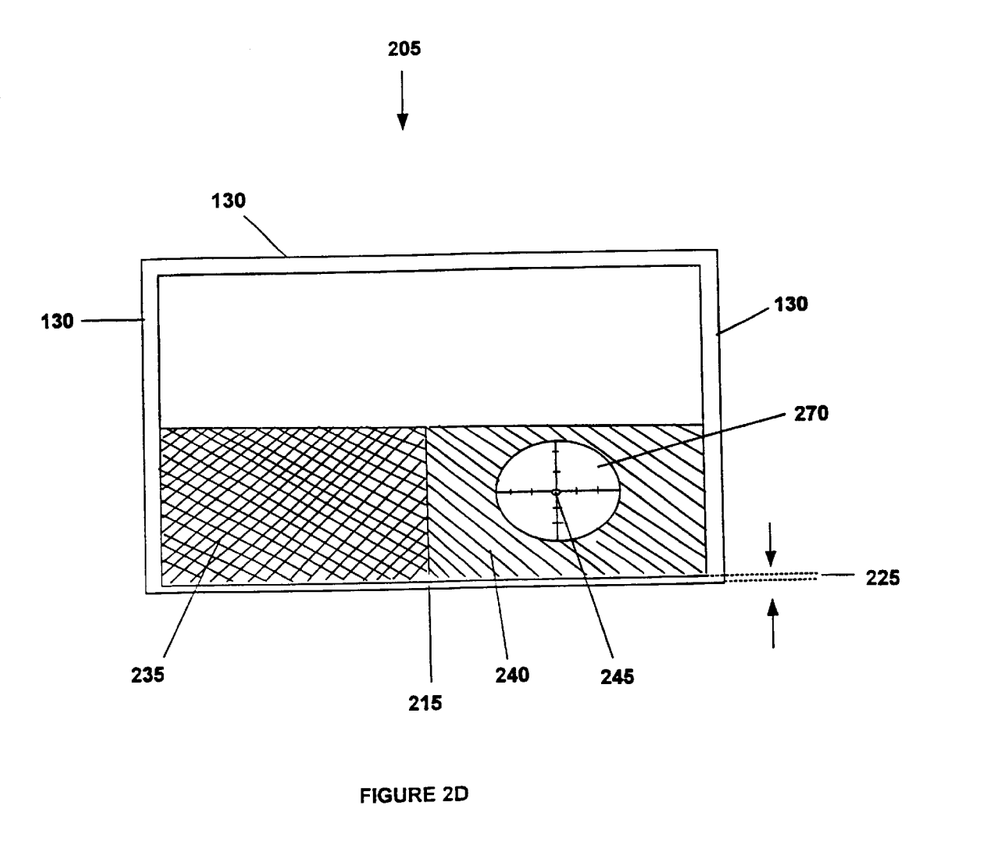
FIG. 2D illustrates the front side of a flush edge detector card having a ruled bullseye around a transmissive hole.

FIG. 2D shows the front side 205 of a flush edge detector card with rectangular sensor regions. The detector card shown in FIG. 2D includes a bullseye target 270 printed around the aperture 245. The bullseye target 270 comprises a plurality of ruled lines extending radially outward from the aperture. In FIG. 2D, the bullseye target 270 has four ruled lines separated from each other by approximately ninety degrees.

Figure 3A:
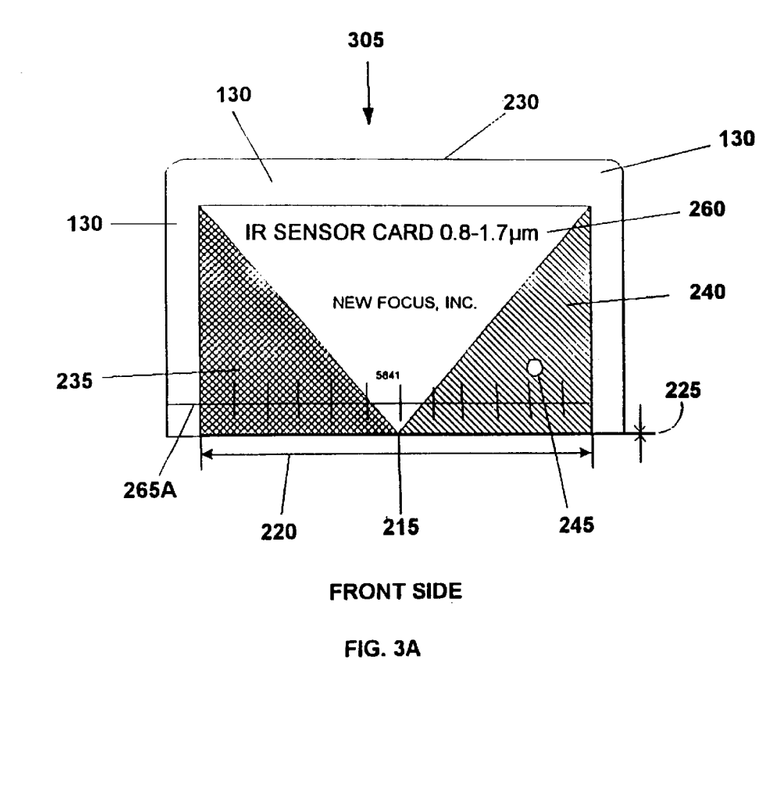
FIG. 3A illustrates the front side of a flush edge detector card with triangular sensor regions.
Figure 3B:
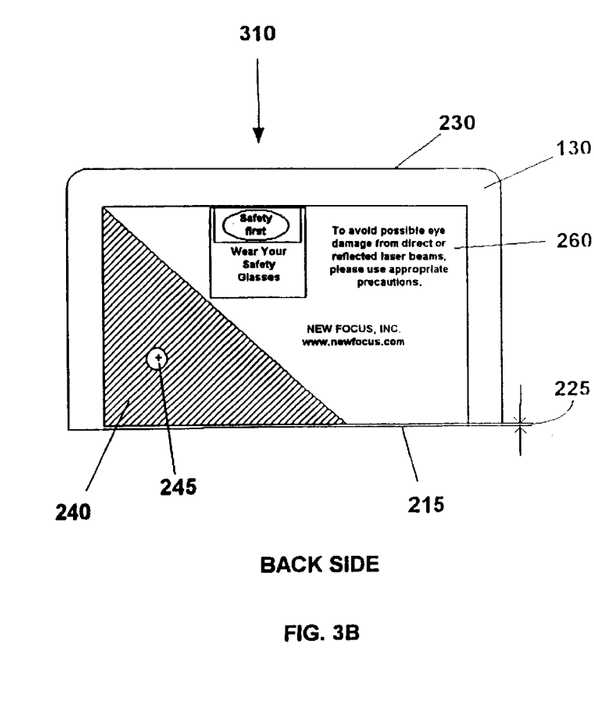
FIG. 3B illustrates the back side of a flush edge detector card with triangular sensor regions.

The front side 305 of the flush edge detector card with triangular sensor regions is shown in FIG. 3A. The back side 310 of the flush edge detector card with triangular sensor regions is shown in FIG. 3B. The features described above with reference to the flush edge detector card 200 with rectangular sensor regions are also provided in the triangular sensor region card.

As shown in FIG. 3A, the reflective sensor portion 235 for the triangular sensor region card extends along the left side of the flush edge portion width 220 and up towards the top edge 230 up to the laminated edge region 130. Similarly, the transmissive sensor portion 240 of the triangular sensor region card extends along the right side of the flush edge portion width 220 and up towards the top edge 230 up to the laminated edge region 130. Other geometric configurations for the reflective sensor 235 and the transmissive sensor 240 are possible including active areas defined by any number of straight line edges greater than or equal to three, a single rounded edge, or a combination of one or more straight edge with one or more rounded edge.

The printed material region 260 on the front side 305 is disposed between the reflective sensor portion 235 and the transmissive sensor portion 240. The printed material region 260 on the back side 310 is disposed above and to the right of the transmissive sensor portion 240. Note also that the ruler corresponding to the flush edge 265A shown in FIG. 3A is disposed further from the flush edge 215 than the corresponding ruler in FIG. 2C.

Figure 4:
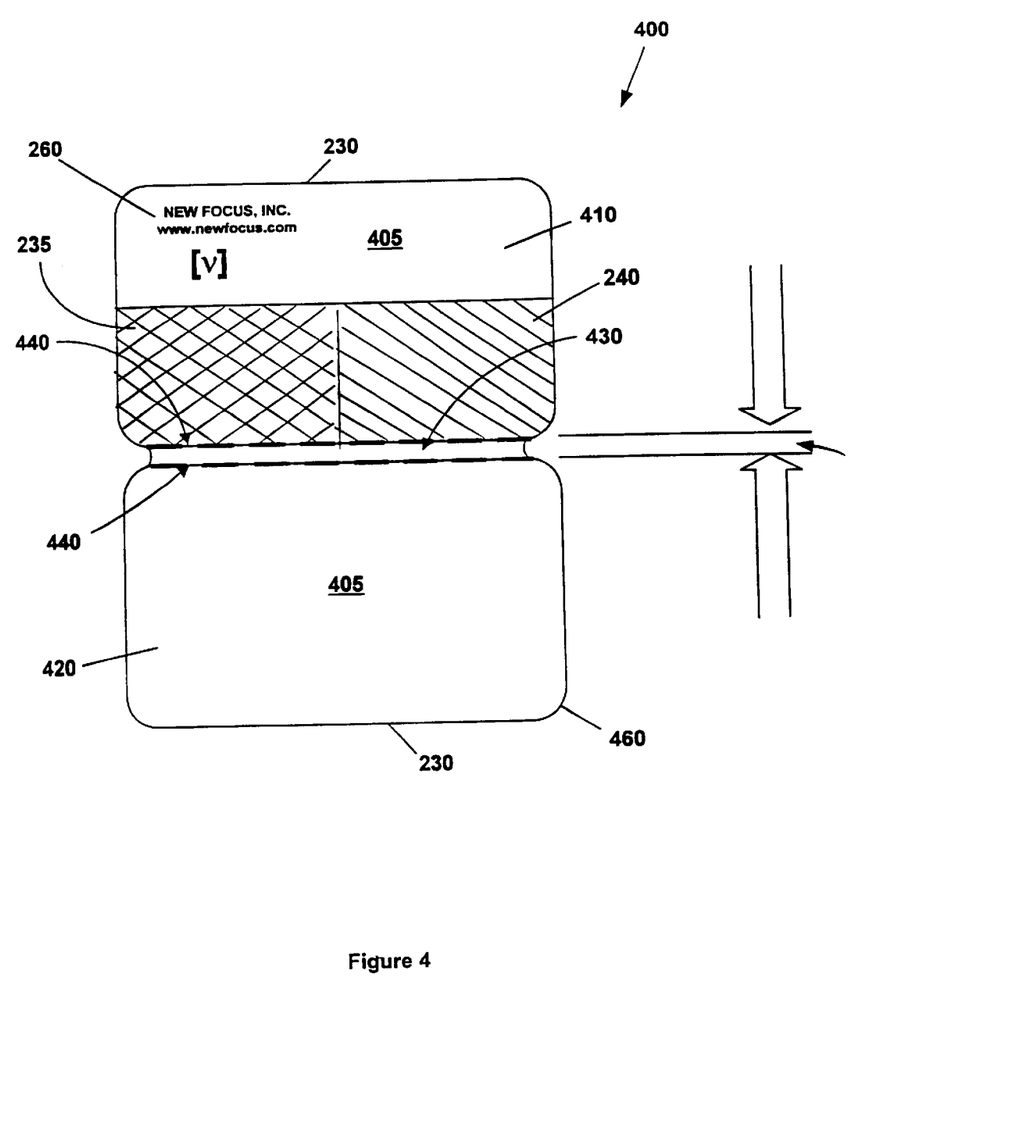
FIG. 4 illustrates a one-piece butterfly jacket embodiment of the flush edge detector card prior to joining the two sides of the jacket.

FIG. 4 illustrates a one-piece jacket 400 flush edge detector card, prior to joining the two sides of the jacket. The one-piece jacket 400 card includes an interior surface 405, a front side laminate layer 410, and a back side laminate layer 420.

The one-piece jacket 400 card is typically a thin essentially rectangular piece of transparent plastic having an interior surface 405, and has adhesive disposed on the interior surface. The one piece jacket 400 card can be smooth or have a matte finish. The one piece jacket 400 card can be made of General Electric Corporation's LEXAN® polycarbonate, or polyester. A matte finish for the laminate layers diffuses the portion of the near-visible light reflected by the protective layer, thereby reducing operator risks from directly viewing such reflected beams.

Before the adhesive is provided on the interior surface 405, the phosphor sensor material is provided on a portion of the transparent plastic interior surface 405. The portion of the transparent plastic interior surface 405 having the sensor material forms the active area of the one piece jacket 400 card and for the embodiment shown in FIG. 4 comprises the reflective sensor region 235 and the transmissive sensor region 240.

Also before the adhesive is provided printed material is provided on a portion of the transparent plastic interior surface 405. The portion of the transparent plastic interior surface 405 having the printed material forms the printed material region 260 of the one piece jacket 400 card.

The one piece jacket 400 card, as shown in FIG. 4, includes the front side laminate layer 410, the back side laminate layer 420, and a central portion 430. The front side laminate layer 410 and the back-side laminate layer 420 have rounded corners 460. The laminate layers can be 0.18 millimeters (7 mils) thick polyester with 0.08 millimeters (3 mils) of adhesive on the interior of the polyester. Each of the laminate layers has a width, a height, and a thickness.

The central portion 430 has a narrow dimension between the laminate layers, and a long dimension parallel to and slightly smaller than the width of the laminate layers. The laminate layers and the central portion 430 form a folded laminate enclosure.

As shown in FIG. 4, the central portion 430 of the one-piece jacket 400 card can have two score lines 440 across the center of the interior (adhesive) surface 405. The score lines 440 are disposed at the same location as the inside edges of the laminate layers thereby defining the central portion 430 width 450 for the one-piece jacket 400 card. The distance separating the score lines 440 is approximately equal to the central portion 430 width 450. In one embodiment of the one piece jacket 400 card, only one score line 440 is used.

The score lines 440 enable the one piece jacket 400 card to be folded into a three-sided surface. After the one piece jacket 400 is folded about the score lines 440, the central portion 430 forms a bottom side of the folded jacket. This folding is similar to the folding discussed below with respect to FIG. 6 for the butterfly laminate jacket 500 for sealing an internal portion.

Each of the laminate layers is connected to the central portion 430 at a scored line 440 disposed on the central portion. The folded laminate enclosure is formed by folding the two laminate layers towards each other so that the interior surface 405 are joined together. The folding is made at each scored line 440.

Figure 5:
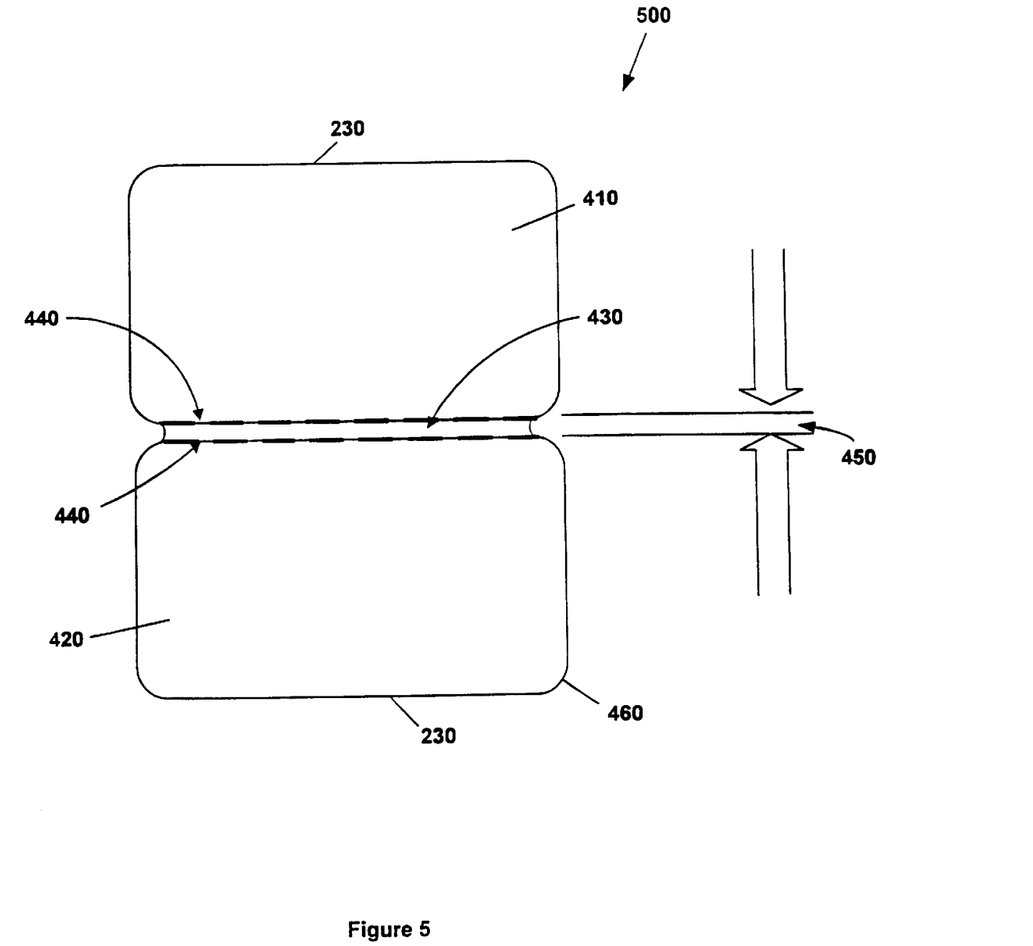
FIG. 5 illustrates a butterfly laminate jacket used to seal an internal portion to form one embodiment of the flush edge detector card.

The flush edge detection card 200 can have an internal portion 700 including the sensor, and the covering can be provided by a jacket adapted for insertion of the internal portion. A butterfly laminate jacket 500 for sealing the internal portion is shown in FIG. 5. In one embodiment of the butterfly laminate jacket 500 for sealing an internal portion, the score lines 440 are approximately 0.13 mm (5 mils) deep and are separated by approximately 0.9 mm.

The butterfly laminate jacket 500 front side laminate layer 410 and back side laminate layer 420 are adapted to seal the internal portion 700 along the front side 210, the back side, and along one or more of the edges of the near-visible light detection apparatus. The laminate layers cover the apparatus and either by themselves or in combination with other sealing surfaces completely cover and protect the phosphor sensor from degradation due to exposure to humidity and air for approximately one to five years.

The distance separating the score lines 440 is larger than two times the internal portion 700 component thickness so that the internal portion can be readily inserted into the butterfly laminate jacket 500, and so that sufficient jacket material is available to form the laminate layers around the internal portion. For example, in the embodiment shown in FIGS. 5 through 7, the internal portion 700 component thickness is approximately 0.25 millimeters or ten mils and the central portion 430 width is approximately 0.9 millimeters (thirty-five mils), which is greater than twice the internal portion 700 component thickness, or 0.5 millimeters (twenty mils).

Figure 6:
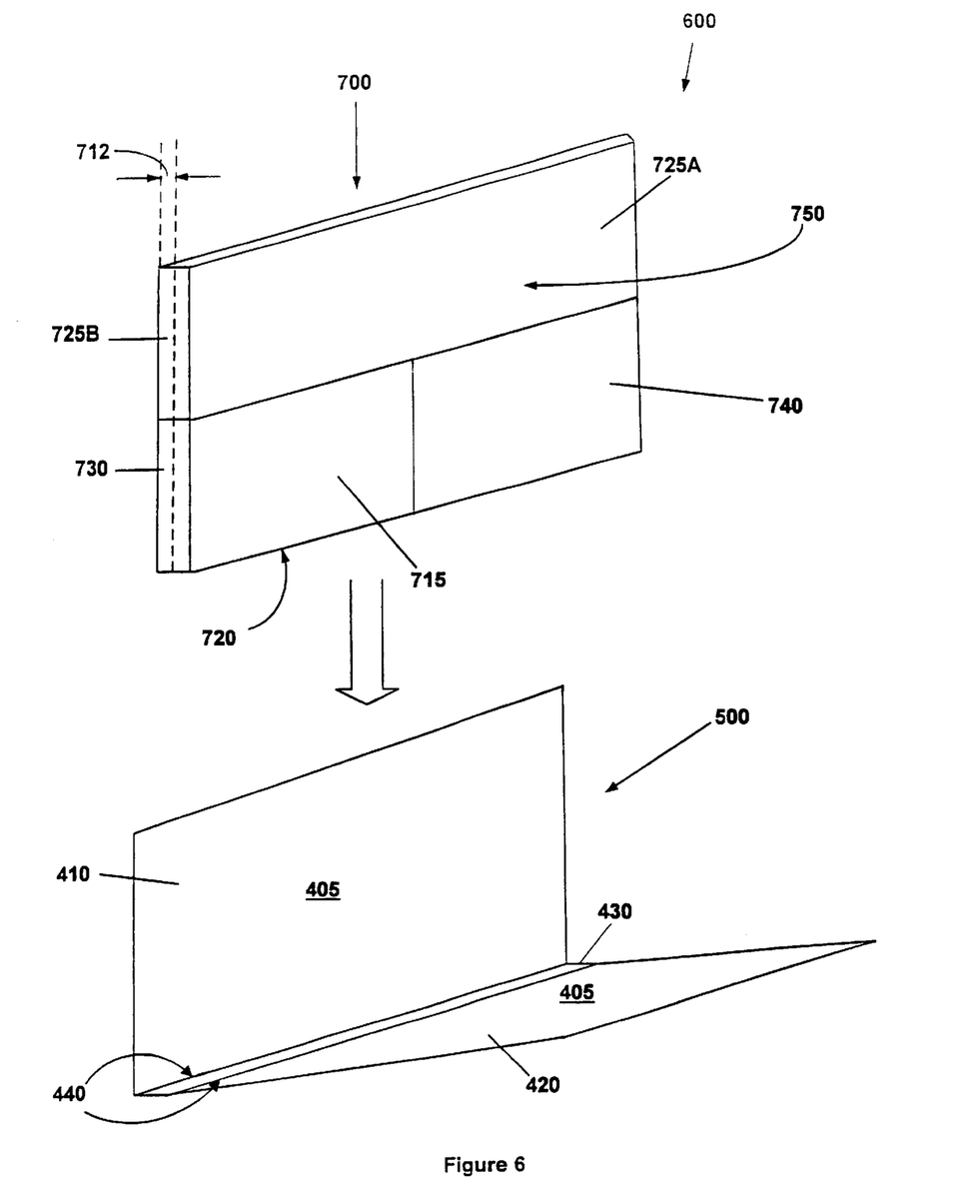
FIG. 6 illustrates a perspective view of the insertion of the internal portion into the butterfly jacket.

FIG. 6 illustrates one technique for insertion of the internal portion 700 into the butterfly laminate jacket 500. After the butterfly laminate jacket 500 is folded about the score lines 440, the central portion 430 forms a bottom side of the folded butterfly laminate jacket. The internal portion 700 is inserted into the folded butterfly laminate jacket 500 so that the internal portion bottom 720 is disposed adjacent to, and butted up against, the bottom side of the folded jacket. The bottom side of the folded butterfly laminate jacket 500 includes the narrow, flat surface of the central portion 430 formed by folding the jacket at the score lines 440. As shown in FIG. 6, the internal portion 700 is typically smaller in width than the butterfly laminate jacket 500.

Figure 7:
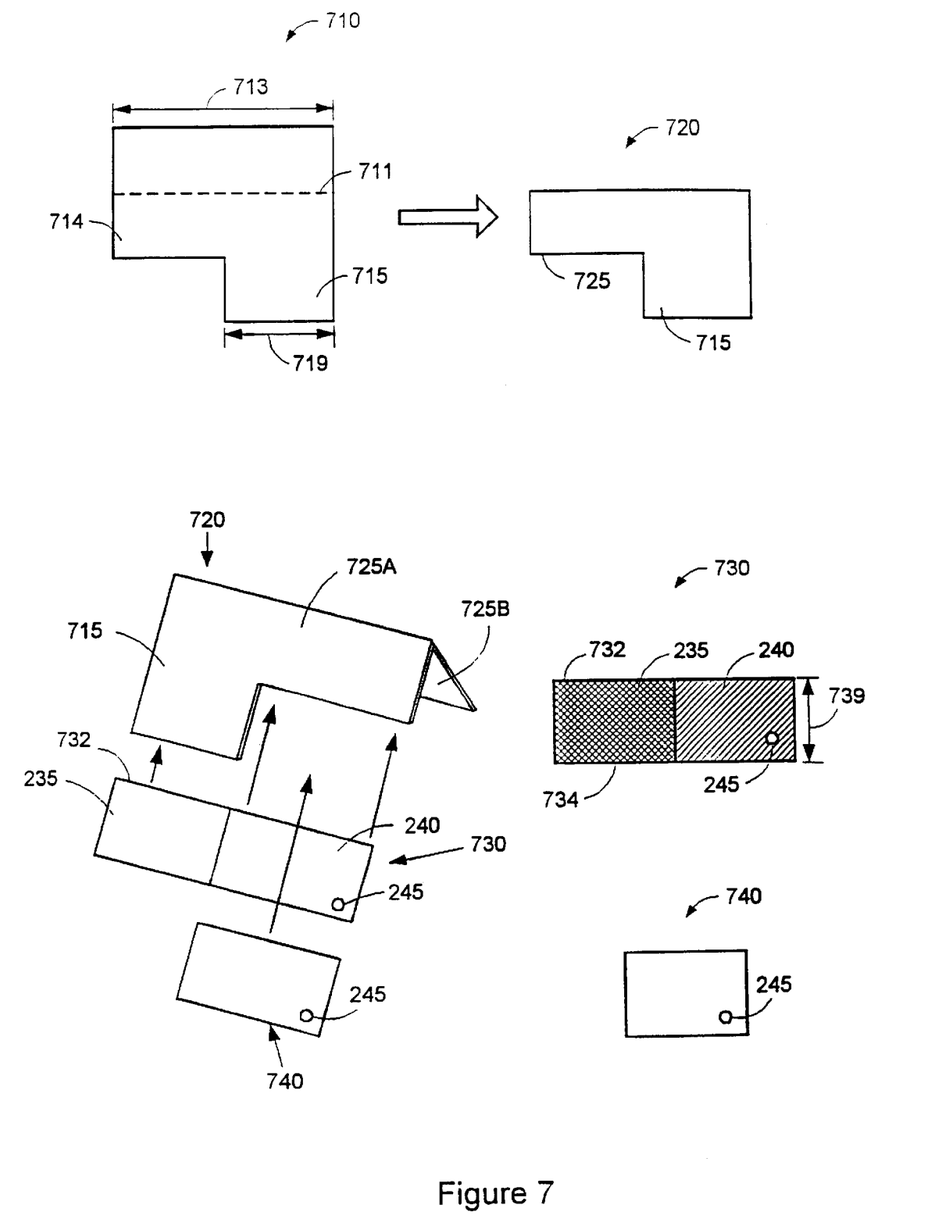
FIG. 7 illustrates the components of the internal portion of the flush edge detector card and the assembly thereof prior to insertion into the butterfly laminate jacket.
Figure 8:
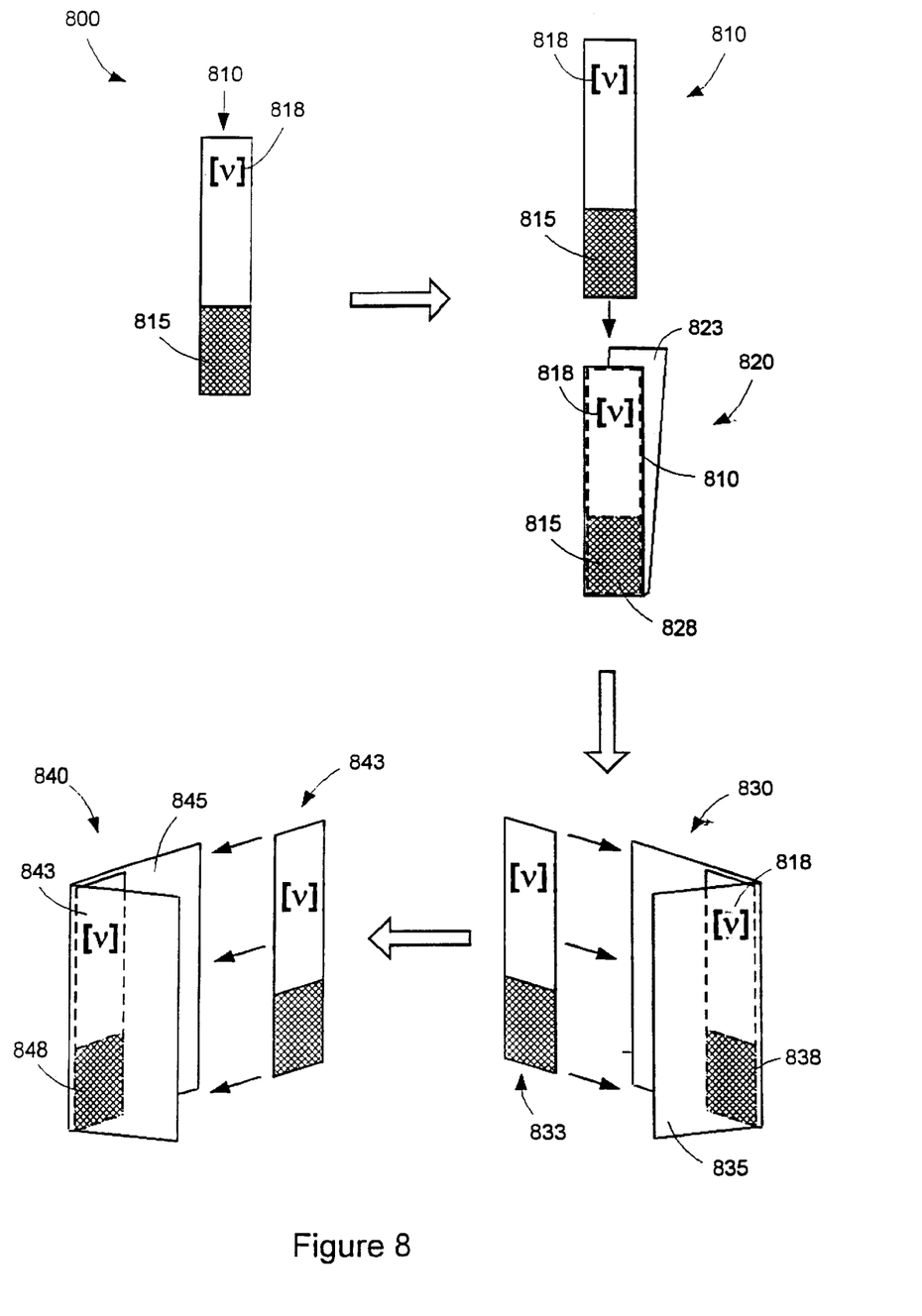
FIG. 8 illustrates the formation of a dipstick detector apparatus having three flush edges.

As shown in FIGS. 5 through 7, the flush edge detector card can comprise an internal portion 700 and a butterfly laminate jacket 500. As shown in FIG. 6, the butterfly laminate jacket 500 is configured to accept insertion of the internal portion 700. Use of the butterfly laminate jacket 500 adapted for insertion of the internal portion 700 provides a folded laminate enclosure covering of the internal portion that requires sealing on only three sides, compared to the prior art configurations for detector cards that required sealing on all four sides of the card.

The internal portion 700, as shown in FIG. 7, can include a substrate. The substrate can be provided in an unfolded configuration referred to herein as the unfolded substrate 710 as shown in FIG. 7. The sensor is attached to the substrate. An example of one type of sensor attachment is described below.

In the example shown in FIG. 7, the internal portion 700 includes a piece of sensor material 730, and a shim 740. The unfolded substrate 710 can be made of Tesling material, from PPG, Industries. Teslin is a high molecular weight polyolefin filled with silica that is used as a synthetic printing sheet with high durability and color retention. Teslin is paper-like and can be used in laser and ink-jet printers. The sensor material 730 can include an IR or a UV phosphor disposed on a Teslin substrate. For some embodiments of the invention, each of the internal portion 700 components is approximately 0.25 millimeters or ten mils thick.

The folded substrate 720 is formed into an L-shape by folding the unfolded substrate 710 about a first axis 711. The unfolded substrate 710 has a thickness 712 (as shown in FIG. 6) and a full width 713. The unfolded substrate 710 includes a full width rectangular portion 714, and a tab portion 715. The folding axis 711 is centrally disposed along the length of the full width rectangular portion 714. The tab portion 715 has a partial width 719 less than the full width 713 of the unfolded substrate 710. The unfolded substrate 710 can include printed graphics for identification of the type of detector card, the manufacturer of the detector card, and/or the owner of the detector card.

After the folding, the folded substrate 720 includes a first rectangular portion 725, and the tab portion 715. The first rectangular portion 725 is formed from the full width rectangular portion 714 of the unfolded substrate 710, and has approximately twice the unfolded substrate thickness 712.

The sensor material 730 is then attached to the tab portion 715. The sensor material 730 has a top edge 732, a bottom edge 734, a left portion, a right portion, and a height 739. In FIG. 7, the right portion of the sensor material 730 is the shown as the transmissive sensor region 240, and the left portion of the sensor material is shown as the reflective sensor 235.

As shown in FIG. 7, the sensor material 730 can be attached so that the top edge 732 of the sensor material is disposed adjacent to, or butted up against, the front side of the first rectangular portion 725B of the folded substrate 720. Looking from the back side of the internal portion 700, as shown in FIG. 7, the left portion of the sensor material is disposed in front of the tab portion 715 of the folded substrate 720. The sensor material 730 can be attached to the tab portion 715 using an adhesive.

The shim 740 has approximately the same height 739 as the sensor material 730. The shim 740 is disposed behind the right portion of the sensor material 730, adjacent to the tab portion 715 of the folded substrate 720. As shown in FIG. 6, the back-side 750 of the assembled internal portion includes the back side of the first rectangular portion 725A disposed above the shim 740 and the tab portion 715.

For the embodiments shown in FIG. 7, the tab portion 715 of the internal portion 700 can be made of a material that reflects the near-visible light spectrum of interest. The tab portion 715 is disposed to the back of the reflective sensor region 235. Also for the embodiments shown in FIG. 7, the shim 740 is typically made of a materials that transmit the near-visible light spectrum of interest, and the shim is disposed to the back of the transmissive sensor region 240. For example, the shim 740 can be made of Teslin with a clear polyester filler.

After the internal portion 700 is inserted into the butterfly laminate jacket 500, the combination of the internal portion and the surrounding jacket is fed into a laminating machine. The butterfly laminate jacket 500 is sealed around the internal portion 700 to form the flush edge detector card with rectangular sensor regions 200.

The flush edge 215 provides greater accuracy for locating near-visible light beams compared to the prior art detection cards. Also, because the phosphor sensor extends much closer to the edge of the flush edge detection card, the user is able to place the sensor in a position to detect the near-visible light in limited access situations, where the prior art sensor card 100 cannot be placed.

For example, using a flush edge detection card having the sensor within 0.3 millimeters of the flush edge 215, a user can slide the flush edge detection card to within 0.3 millimeters of an impinged area to detect a beam in an evaluation system having tightly spaced components. Prior art detection card 100 lamination coverings extend approximately 2 millimeters outwards from the phosphor sensor to the edge of the card. For apparatus that allow detector card access no farther than 0.3 to 2 millimeters from any entry point, the flush edge detector cards provide a distinct advantage.

FIG. 8 shows the formation of a dipstick detector apparatus 800 embodiment of the near-visible light detection apparatus. The dipstick detector apparatus provides a narrow width active area for insertion into restricted width beam access points. In some embodiments, the dipstick detector apparatus provides a plurality of flush edges 215. At the completion of the formation of a dipstick detector apparatus 800 as described herein, the dipstick detector apparatus has three flush edges.

The internal portion 810 of the dipstick detector apparatus includes a sensor region 815 and a printed matter region 818.

As shown in FIG. 8, the active area comprises a single rectangular shaped reflective sensor. However, the active area can comprise a transmissive sensor or can include both types of sensors. The sensor region can be provided in a variety of shapes according to the requirements of a particular application. The dipstick detector apparatus can also comprise various shapes other than the rectangle shown in FIG. 8. For example, the dipstick detector apparatus can be shaped as a trapezoid wherein the sensor region 815 is thinner than the printed matter region 818.

In the first dipstick insertion 820, the internal portion 810 is inserted into the first laminate jacket 823 so that the bottom edge of the internal portion is butted up against the central folded portion of the first laminate jacket. The central folded portion of the first laminate jacket 823 is disposed at the bottom edge thereof in FIG. 8. After the first dipstick insertion 820, the first laminate jacket 823 is subjected to a first lamination step whereby the first laminate jacket encapsulates the internal portion 810 to form a first encapsulated dipstick.

After the first lamination step, the bottom edge of the internal portion forms a first flush edge 828. Prior to the second dipstick insertion 830, any excess laminate material disposed to the right of the active area is trimmed from the first encapsulated dipstick to form a first trimmed dipstick 833.

In the second dipstick insertion 830, the first trimmed dipstick 833, is inserted into the second laminate jacket 835 so that the right edge of the first trimmed dipstick 833 is butted up against the central folded portion of the second laminate jacket. The central folded portion of the second laminate jacket 835 is disposed at the right edge thereof in FIG. 8. After the second dipstick insertion 830, the second laminate jacket 835 is subjected to a second lamination step whereby the second laminate jacket encapsulates the first trimmed dipstick 833 to form a second encapsulated dipstick.

After the second lamination step, the right edge of the first trimmed dipstick 833 forms a second flush edge 838. In order to preserve the first flush edge 828, during the second lamination step, the bottom edge of the second laminate jacket can be disposed above the first flush edge by a first offset distance. The first offset distance is greater than the distance corresponding to the spreading of the laminate material over the bottom edge of the first trimmed dipstick 833 during the second lamination step. Prior to the third dipstick insertion 840, any excess laminate material disposed to the left of the active area is trimmed from the second encapsulated dipstick to form a second trimmed dipstick 843.

In the third dipstick insertion 840, the second trimmed dipstick 843, is inserted into the third laminate jacket 845 so that the left edge of the second trimmed dipstick 843 is butted up against the central folded portion of the third laminate jacket. The central folded portion of the third laminate jacket 845 is disposed at the left edge thereof in FIG. 8. After the third dipstick insertion 840, the third laminate jacket 845 is subjected to a third lamination step whereby the third laminate jacket encapsulates the second trimmed dipstick 843 to form a third encapsulated dipstick.

After the third lamination step, the left edge of the second trimmed dipstick 843 forms a third flush edge 848. In order to preserve the first flush edge 828, during the third lamination step, the bottom edge of the third laminate jacket 845 can be disposed above the first flush edge by a second offset distance. The second offset distance is greater than the distance corresponding to the spreading of the laminate material over the bottom edge of the second trimmed dipstick 843 during the third lamination step.

Similarly, to preserve the second flush edge 838, the right edge of the third laminate jacket 845 can be disposed to the left of the second flush edge by a third offset distance. The third offset distance is greater than the distance corresponding to the spreading of the laminate material over the right edge of the second trimmed dipstick 843 during the third lamination step. Alternatively, the excess laminate material on covering any flush edge can be trimmed after the lamination process.

All the disclosed embodiments of the invention described herein can be realized and practiced without undue experimentation. Although the best mode of carrying out the invention contemplated by the inventor is disclosed above, practice of the invention is not limited thereto. Accordingly, it will be appreciated by those skilled in the art that the invention may be practiced otherwise than as specifically described herein.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended claims.

What is claimed is:

1. An apparatus for detecting near-visible frequency light, comprising:

a sensor including a near-visible to visible light conversion phosphor defining an active area, the phosphor extending to within about a first distance of a flush portion of a first edge, wherein the active area comprises an aperture; and a covering having a thickness, the covering adapted to substantially protect the phosphor from degradation, the first distance corresponding approximately to the thickness of the covering.

2. The apparatus of claim 1, wherein the number of edges is four, and the edges form a rectangle.

3. The apparatus of claim 2, wherein:

the rectangle has a width of approximately 85 millimeters and a height of approximately 55 millimeters; and the apparatus has a thickness of less than approximately 5 millimeters.

4. The apparatus of claim 2 wherein:

the width is less than the height; and the phosphor extends to within about the first distance of flush portions disposed on a plurality of the edges.

5. The apparatus of claim 1, wherein the apparatus has a front and a back, and the active area includes:

a reflective sensor portion having an opaque material disposed between the back and the phosphor; and a transmissive sensor portion adapted to provide an indication of impingement of near visible light on the back side and on the front side, the phosphor in the transmissive sensor portion and the phosphor in the reflective sensor portion disposed proximal to the flush portion.

6. The apparatus of claim 5, wherein:

the front has a first portion having the transmissive sensor, a second portion having the reflective sensor, and a third portion for displaying printed items; and the back has a first portion having the transmissive sensor and a second portion for displaying printed items.

7. The apparatus of claim 6, wherein the printed items include personal user identification information.

8. The apparatus of claim 1, wherein the covering includes:

an adhesive layer disposed proximally to the sensor; and a polyester layer disposed externally to the adhesive layer.

9. The apparatus of claim 1, wherein the apparatus comprises a laminated detector card.

10. The apparatus of claim 9, wherein the laminated detector card includes:

an internal portion including the sensor, and the covering provided by a jacket adapted for insertion of the internal portion, the jacket having:

two laminate layers, each of the laminate layers having a width, a height, and a thickness; and a central portion connecting the two laminate layers, the central portion having a narrow dimension between the laminate layers, and a long dimension parallel to and slightly shorter than the width of the laminate layers, the laminate layers and the central portion forming a folded laminate enclosure.

11. The apparatus of claim 10, wherein:

the internal portion includes a substrate;

the sensor is attached to the substrate;

each of the two laminate layers connected to the central portion at a scored line disposed on the central portion, the folded laminate enclosure formed by folding the two laminate layers towards each other, the folding at each scored line; and the sensor butted up against the central portion.

12. The apparatus of claim 11, wherein the score lines are separated by less than about 1.0 millimeter.

13. The apparatus of claim 10, wherein:

the thickness of each of the laminate layers is less than about 0.3 millimeters; and the internal portion is less than about 0.6 millimeters thick.

14. The apparatus of claim 1, wherein the near-visible light includes infrared light having wavelengths approximately between 0.8 micrometers and 1.7 micrometers.

15. The apparatus of claim 1, wherein the near-visible light includes ultraviolet light having wavelengths approximately between 250 nanometers and 500 nanometers.

16. The apparatus of claim 1, wherein:

the covering has a first inner surface and a second inner surface, the first inner surface joined to the second inner surface; and the sensor disposed on the first inner surface.

17. The apparatus of claim 1, including a substrate having a substrate surface, the sensor positioned on the substrate surface, and the covering adapted to cover the substrate and the sensor.

18. An apparatus for detecting near-visible frequency light, comprising:

conversion means, extending to within about a first distance of a flush portion of a first edge, for converting near-visible to visible light, wherein the conversion means comprise an aperture; and covering means for substantially protecting the conversion means from degradation, the covering means having a thickness, wherein the first distance corresponds approximately to the thickness of the covering means.

19. The apparatus of claim 18, wherein the apparatus has a front and a back, and the conversion means comprise:

a phosphor;

a reflective sensor portion having an opaque material disposed between the back and the phosphor; and a transmissive sensor portion adapted to provide an indication of impingement of near visible light on the back side and on the front side, the phosphor in the transmissive sensor portion and the phosphor in the reflective sensor portion disposed proximal to the flush portion.

20. The apparatus of claim 19, wherein:

the front has a first portion having the transmissive sensor, a second portion having the reflective sensor, and a third portion for displaying printed items; and the back has a first portion having the transmissive sensor and a second portion for displaying printed items.

21. The apparatus of claim 18, wherein the near-visible light includes infrared light having wavelengths approximately between 0.8 micrometers and 1.7 micrometers.

22. The apparatus of claim 18, wherein the near-visible light includes ultraviolet light having wavelengths approximately between 250 nanometers and 500 nanometers.

* * * * *